Oct. 11, 1927.  
D. COHEN  
1,645,475  
LIQUID MEASURING AND DISPENSING APPARATUS  
Filed Feb. 5, 1926  
2 Sheets-Sheet 1

WITNESSES

INVENTOR  
David Cohen  
BY  
ATTORNEYS

Oct. 11, 1927.

D. COHEN 1,645,475

LIQUID MEASURING AND DISPENSING APPARATUS

Filed Feb. 5, 1926          2 Sheets-Sheet 2

WITNESSES

INVENTOR
David Cohen
BY
ATTORNEYS

Patented Oct. 11, 1927.

1,645,475

UNITED STATES PATENT OFFICE.

DAVID COHEN, OF BROOKLYN, NEW YORK.

LIQUID MEASURING AND DISPENSING APPARATUS.

Application filed February 5, 1926. Serial No. 86,292.

The liquid measuring and dispensing apparatus of the present invention while lending itself to a wide range of utility, is peculiarly adapted for dispensing small quantities of milk in retail stores. It is an object of the invention to provide a dispensing apparatus of this character, which will retain the milk or other liquid to be measured and dispensed, in a cool and sanitary condition at all times, and which will render the operation of pouring out a measured quantity of the liquid, both accurate and expeditious.

Other objects of the invention are to provide a dispensing apparatus of simple, practical construction, which will be rugged and durable in use, which may be readily flushed and cleaned, which may be manufactured and installed with comparative economy, and which may be easily operated.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein Fig. 1 is a fragmentary view mainly in vertical section through an apparatus embodying the present invention showing the same mounted in an icebox.

Figure 1:
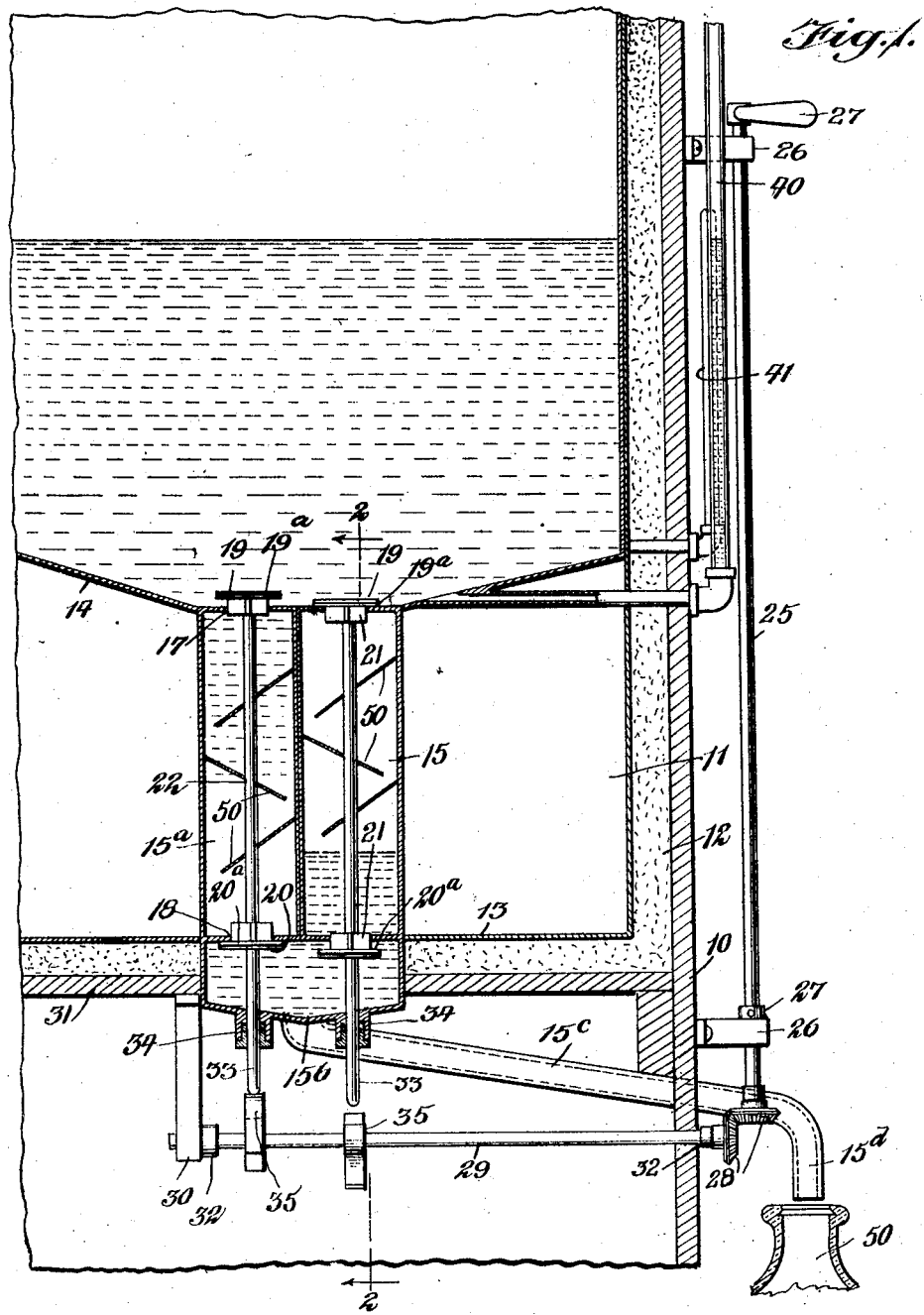

It will be understood that while I have shown my apparatus as mounted within an icebox or cooling chamber, the particular location at which the apparatus is set up is optional with the user.

In the drawings a refrigerator or icebox is designated by the reference character 10. The ice compartment 11 of the box is lined with suitable heat insulating material 12 and may be further lined by metallic inner wall 13. Within the chamber 11 I preferably mount a reservoir 14 for the liquid to be dispensed. This reservoir is filled through any suitable filling opening (not shown), and has valved communication at its lower end with two pairs of measuring cylinders 15, 15$^a$ and 16, 16$^a$ respectively. The cylinders 15, 15$^a$ have valve controlled communication at their lower ends with a header or chamber 15$^b$ connected with a discharge pipe 15$^c$ terminating in a discharge nozzle 15$^d$ disposed at the exterior of the icebox 10. The cylinders 16, 16$^a$ communicate with a header 16$^b$ connected to a discharge pipe 16$^c$ which terminates in a nozzle similar to the nozzle 15$^d$.

A feature of the present invention is the novel valve construction which is utilized for controlling the filling and emptying of the measuring cylinders. Inasmuch as the valve mechanism for each cylinder is similar, a description of one such mechanism will serve for all. It may be noted that the only difference in the valve mechanism for the two pairs of cylinders is in the length of the stems since the cylinders 16, 16$^a$ are adapted for measuring small quantities of liquid, such as pints, while the cylinders 15, 15$^a$ are adapted for measuring larger quantities of liquid such as quarts.

Each cylinder is provided with an inlet opening 17 at its upper end communicating with the reservoir, and an outlet opening 18 at its lower end communicating with its header 15$^b$ or 16$^b$ as the case may be. Coacting with the openings 17 and 18 are inlet valves 19 and 20 respectively. These valves may be in the nature of flat members mounted on spiders 21 rigid with valve stems 22 which couple the inlet and outlet valves. The valves are faced with some yieldable material such as is indicated at 19$^a$, 20$^a$ to insure tight seating, or if desired this material may constitute the seat instead of being carried by the valves. When a valve stem 22 is in depressed position, the inlet valve 19 will rest flatly against the bottom of the reservoir and prevent the passage of liquid from the reservoir into the measuring cylinder. At the same time the outlet valve 20 will have moved off its seat at the lower end of the cylinder, and the contents of the cylinder will discharge into the header. When the stems are shifted to elevated position, valves 20 will bear against the under face of the cylinder and prevent emptying of the contents thereof, while the valves 19 will be shifted off of their seats and permit the cylinders to fill, liquid flowing in around the valve stems through the spiders 21. It will be noted that the valves 19 and 20 respectively limit the movement of the valve stems 22 in opposite directions. By using flat valves, and making the inlet and outlet openings of relatively large area, the extent of movement of the valve stems need be only slight, and yet the filling and emptying of the measuring cylinders will be effected rapidly.

It will be noted that as valve stem 22 is shifted upwardly, the valve 19 will move off its seat before the valve 20 closes, thus momentarily leaving a free passage for milk from the reservoir to the header. Under normal conditions the time between opening valve 19 and closing valve 20 is so short that no milk from the reservoir can pass through the measuring cylinder. However, as a safeguard against this contingency, I provide staggered series of baffle plates 50 in the cylinders which interrupt and delay the downflow of liquid therethrough. These baffle plates also constitute guides for the valve stems. Preferably the shorter cylinders 16, 16ª are provided with a greater number of baffles than the longer cylinders 15, 15ª, since under normal conditions the liquid from the reservoir would pass more quickly through the shorter cylinders.

A further feature of the invention is the novel method by which I effect operation of the valves to regulate the filling and emptying of the measuring cylinders. A similar operating mechanism is associated with each pair of measuring cylinders, and only one such operating mechanism need be described, to wit: the one for the cylinders 15, 15ª.

This operating mechanism includes a vertical rock shaft 25 which may be conveniently mounted within the box, but which, as shown, is journalled in bearing brackets 26 secured to the outer face of the icebox 10. Axial shifting movement of the rock shaft is prevented in any suitable manner as by a collar 27 engaging one of the brackets. The rock shaft is provided preferably at its upper end with a handle in the nature of a crank arm 27. At its lower end, the rock shaft is connected through suitable mechanism such as bevel gears 28 to a horizontal cam shaft 29, journalled in the front wall of the icebox, and in a suitable hanger 30 depending from a horizontal partition 31 in the icebox. Collars 32 prevent axial shifting movement of the cam shaft.

Figure 2:
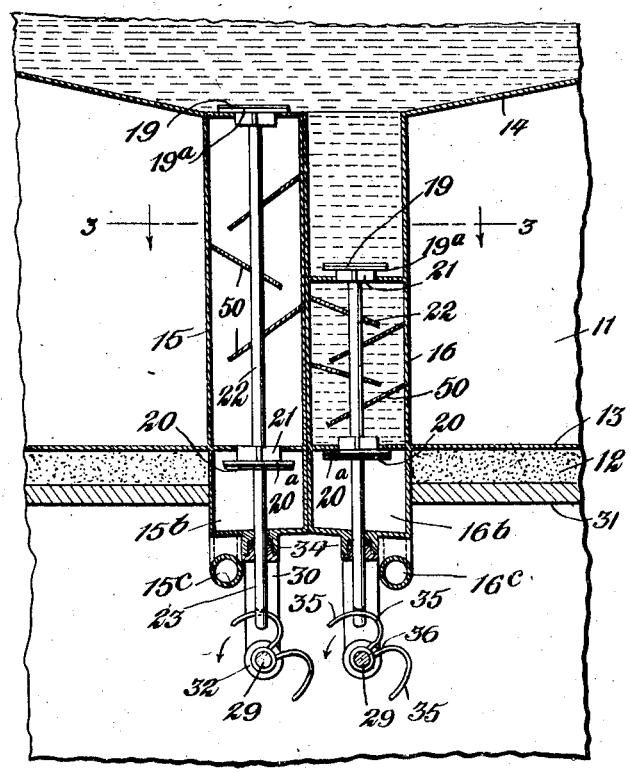
Fig. 2 is a vertical sectional detail taken approximately on the line 2—2 of Fig. 1.
Figure 3:
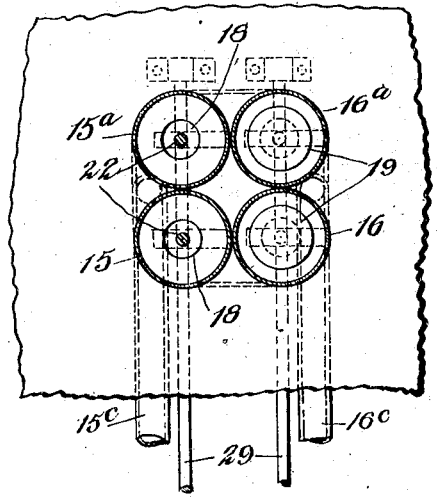
Fig. 3 is a transverse sectional view on the line 3—3 of Fig. 2.

The valve stems 22 include extensions 33 passing through stuffing boxes 34 in the bottom of the headers. The downwardly projecting extensions 33 are adapted to be engaged by cam elements 35 mounted on the cam shaft 29. As best seen in Fig. 2, the cams 35 are spaced about the shaft in such a manner as to provide clearance at 36 between them for the lower ends of both extensions 33 at times when both chambers 15, 15ª are empty. By grasping the handle 27 and rocking the shaft 25 to the right, the rear cam 35 will engage its associated valve stem extension 33 and shift the valves 19 and 20 of cylinders 15ª to the position shown in Fig. 1, at which time the cylinder 15ª will fill from the reservoir. Upon grasping the handle 27 and swinging the same to the left, the rear cam 35 will pass out from under its valve stem extension 33, the weight of the liquid in the reservoir and in the measuring cylinder 15ª will effect closing of the valve 19 and opening of the valve 20, the contents of the cylinder discharging through the header 15ᵇ, pipe 15ᶜ and nozzle 15ᵈ into a suitable receptacle at 50.

At the same time the front cam 35 will have elevated its associated valve stem extension 33, and the cylinder 15 will be filling. In ordinary operation, the handle is shifted from one extreme position to the other at each operation so that one cylinder always fills while the other empties, and there will always be a measured supply of milk or other liquid ready for dispensing. The same thing is true of the operation of the cylinders 16, 16ª, these cylinders as above noted, measuring smaller quantities of liquid, than the cylinders 15, 15ᵇ.

By making cams 35 of spring metal, I assure the tight seating of the outlet valves 13 against the hydrostatic head of the liquid in the reservoir. The spring cams render the provision of positive stop means to limit the rotation of the cam shaft unnecessary, since the handle 27 is swung each time to such a position that the cams are firmly jammed under their respective valve stem extensions.

In use the reservoir is preferably provided with an associated gauge glass 40 for indicating the liquid level in the reservoir, and with a thermometer 41 for indicating the temperature of the liquid. It will be evident that an apparatus as above described fully satisfies the objects of the present invention, and is well suited to the requirements of every day use.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim—

1. A liquid dispensing apparatus including a reservoir, a pair of measuring cylinders disposed below the reservoir and communicating at their upper ends therewith, vertically disposed valve stems arranged within the measuring cylinders, a header communicating with the lower ends of the measuring cylinders, inlet and outlet valves fixed to the valve stems operable to selectively close communication either between the cylinders and reservoir or between the cylinders and header, said valve stems including operating extensions projecting through and extending below the header, a horizontal cam shaft mounted under the header, lifting cams on the shaft engageable with the depending ends of the valve stems to force the latter upwardly and close the outlet valves.

2. A liquid dispensing apparatus including a reservoir, a pair of measuring cylinders disposed below the reservoir and communicating at their upper ends therewith, vertically disposed valve stems arranged within the measuring cylinders, a header communicating with the lower ends of the measuring cylinders, inlet and outlet valves fixed to the valve stems operable to selectively close communication either between the cylinders and reservoir or between the cylinders and header, said valve stems including operating extensions projecting through and extending below the header, a horizontal cam shaft mounted under the header, lifting cams on the shaft engageable with the depending ends of the valve stems to force the latter upwardly and close the outlet valves, said cams being of spring metal and compressible as the valve stem extensions ride over them.

3. A liquid dispensing apparatus including a reservoir, a pair of measuring cylinders disposed below the reservoir and communicating at their upper ends therewith, vertically disposed valve stems arranged within the measuring cylinders, a header communicating with the lower ends of the measuring cylinders, inlet and outlet valves fixed to the valve stems operable to selectively close communication either between the cylinders and reservoir or between the cylinders and header, said valve stems including operating extensions projecting through and extending below the header, a horizontal cam shaft mounted under the header, lifting cams on the shaft engageable with the depending ends of the valve stems to force the latter upwardly and close the outlet valves, and a vertically disposed rock shaft operatively connected to the cam shaft.

4. A liquid dispensing apparatus including a reservoir, a pair of measuring cylinders disposed below the reservoir and communicating at their upper ends therewith, vertically disposed valve stems arranged within the measuring cylinders, a header communicating with the lower ends of the measuring cylinders, inlet and outlet valves fixed to the valve stems operable to selectively close communication either between the cylinders and reservoir or between the cylinders and header, and a staggered series of baffle plates in the measuring cylinders for retarding the flow of liquid from the upper ends to the lower ends of said cylinders, whereby to prevent discharge of milk from the cylinders between the time that the inlet valves open and the outlet valves close, said baffle plates extending more than half the width of the cylinders and constituting guides for the valve stems.

5. The combination with a casing having a refrigerated compartment therein, of a reservoir in the compartment, measuring cylinders communicating with the lower end of the reservoir, a header communicating with the lower ends of the measuring cylinders, valve stems in the measuring cylinders, inlet and outlet valves carried thereby, the ends of the stems projecting below the refrigerated compartment, a delivery spout communicating with the header and terminating at the exterior of the casing, a hanger depending from the bottom of the compartment, a cam shaft journalled in said hanger and in the wall of the casing, and cams on the shaft engageable with the valve stem extensions.

6. A device of the class described in claim 5, wherein brackets secured to the exterior of the casing wall provide mounting for a vertically disposed rock shaft, and operative connections are provided between the rock shaft and the cam shaft.

DAVID COHEN.